United States Patent
Motohashi (10) Patent No.: US 10,178,307 B2
(45) Date of Patent: Jan. 8, 2019

(54) IMAGE PROCESSING SYSTEM (71) Applicant: SMK Corporation, Tokyo (JP)

(72) Inventor: Kazutaka Motohashi, Chiba (JP)

(73) Assignee: SMK Corporation, Tokyo (JP)

( * ) Notice: Subject to any disclaimer, the term of this patent is extended or adjusted under 35 U.S.C. 154(b) by 238 days.

(21) Appl. No.: 15/072,368

(22) Filed: Mar. 17, 2016

(65) Prior Publication Data
US 2016/0198089 A1 Jul. 7, 2016

Related U.S. Application Data (63) Continuation of application No. PCT/JP2014/064352, filed on May 23, 2014.

(30) Foreign Application Priority Data

Mar. 3, 2014 (JP) .................................. 2014-40217

(51) Int. Cl.
H04N 5/232 (2006.01)
H04N 5/00 (2011.01)
H04N 5/247 (2006.01)

(52) U.S. Cl.
CPC ......... *H04N 5/23238* (2013.01); *H04N 5/247* (2013.01)

(58) Field of Classification Search
CPC ........................... H04N 5/23238; H04N 5/247
(Continued)

(56) References Cited

U.S. PATENT DOCUMENTS

| 5,486,853 A * | 1/1996 | Baxter | H04N 5/23203 348/222.1 |
| 6,229,573 B1 * | 5/2001 | Sato | H04N 5/12 348/516 |

(Continued)

FOREIGN PATENT DOCUMENTS

| JP | 2004-282465 A | 10/2004 |
| JP | 2010-171766 A | 8/2010 |
| JP | 2012-138671 A | 7/2012 |

OTHER PUBLICATIONS

Office Action issued for counterpart Japanese Application 2014-040217, issued by the Japan Patent Office dated Oct. 4, 2016.
(Continued)

*Primary Examiner* — Jeffery A Williams (57) ABSTRACT

An image processing system includes camera modules each including an imager configured to acquire an image at the timing of a vertical synchronization signal, and a phase controller configured to control the phase of the vertical synchronization signal, and each configured to output the vertical synchronization signal together with a corresponding one of image signals of images of different imaging fields; a phase monitoring unit configured to compare the phases of the vertical synchronization signals from the camera modules; a relative phase control unit configured to output a relative phase control signal to the phase controller of each camera module at a predetermined cycle such that the vertical synchronization signals monitored by the phase monitoring unit are synchronized with each other; and an image synthesizing unit configured to synthesize the images at the timing of the synchronized and controlled vertical synchronization signal to generate a single synthesized image.

6 Claims, 4 Drawing Sheets (58) Field of Classification Search
USPC .......................................................... 348/38
See application file for complete search history.

(56) References Cited

U.S. PATENT DOCUMENTS

| | | | |
|---|---|---|---|
| 2002/0034316 A1* | 3/2002 | Ishii | ........................ G06T 15/20 |
| | | | 382/104 |
| 2006/0139488 A1 | 6/2006 | Suzuki et al. | |
| 2007/0097224 A1* | 5/2007 | Haneda | ................ H04N 13/239 |
| | | | 348/221.1 |

OTHER PUBLICATIONS

International Search Report for International Application No. PCT/JP2014/064352, issued by the Japan Patent Office dated Aug. 12, 2014.

* cited by examiner

IMAGE PROCESSING SYSTEM

CROSS REFERENCE TO RELATED APPLICATION

The contents of the following Japanese patent application and International patent application are incorporated herein by reference, Japanese Patent Application No. 2014-40217 filed on Mar. 3, 2014, and International Patent Application No. PCT/JP2014/64352 filed on May 23, 2014.

FIELD

The present invention relates to an image processing system configured to synthesize a plurality of images of different imaging fields to generate a single synthesized image, and more specifically, relates to an image processing system configured to output, as a video picture, continuously-generated synthesized images to a monitor.

BACKGROUND

Figure 1:
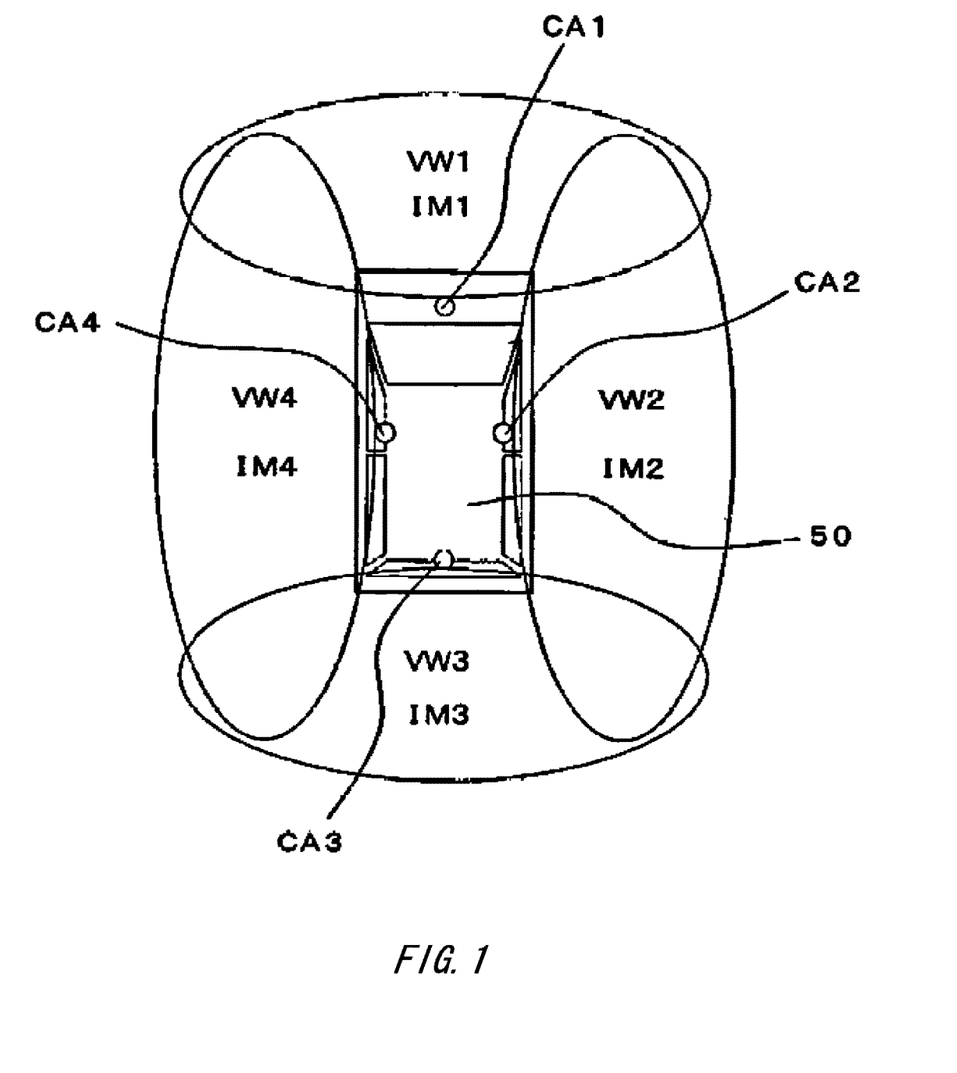
FIG. 1 is a plan view illustrating imaging fields of camera modules CA1 to CA4 each placed at a corresponding portion of a vehicle 50.

The following image processing system has been known as an operation support system for a vehicle. As illustrated in FIG. 1, a plurality of camera modules CA1 to CA4 images, at a fixed cycle, different imaging fields at the periphery of a vehicle 50. Then, the images acquired by the camera modules CA1 to CA4 are synthesized into a single overhead image of the periphery of the vehicle 50, and continuously-generated overhead images are, as a video picture, displayed on a display device placed at the periphery of a driver's seat.

In the case of synthesizing images acquired by the plurality of camera modules CA1 to CA4 into a single synthesized image, it is necessary to synchronize the plurality of images to be synthesized. Typically, image signals indicating images output from the individual camera modules CA1 to CA4 in a non-synchronized state are temporarily stored in a buffer, and then, the images of the camera modules CA1 to CA4 with approximate phases of vertical synchronization signals Vsync input together with the image signals are selected and read from many image signals stored in the buffer. Subsequently, the selected images are synthesized (Patent Document 1). That is, the phase difference among the images is eliminated by a storage time in the buffer, and the images input from the camera modules CA1 to CA4 are synchronized with each other to generate the synthesized image.

CITATION LIST

Patent Literature

Patent Document 1: Japanese Patent Application Publication No. 2006-180340

SUMMARY

Technical Problem

In the typical image processing system described in Patent Document 1, since the images input from the plurality of camera modules CA1 to CA4 in the non-synchronized state are temporarily stored in the buffer, the synthesized image is generated based on one, which is input with the phase being most delayed, of the images input from the camera modules CA1 to CA4, and there is a delay time until the image is displayed on a monitor.

No problem is caused as long as the above-described image processing system is used for the purpose of an operation support system for assisting a driver's eyesight in, e.g., garaging of a vehicle or pulling over of a vehicle. However, an image processing system used for the purpose of detecting, for accident prevention, an object(s) approaching a vehicle at high speed requires real-time performance to a maximum extent, and cannot overlook a delay due to temporal storage in a buffer.

Further, the timing of imaging by the camera modules CA1 to CA4 is asynchronous. For this reason, when an obstacle(s) appears instantaneously, some of the camera modules cannot perform imaging, leading to the problem in which the synthesized images are not continuous. For example, the camera modules CA1 to CA4 output images to an image synthesizing device with 30 frames (images)/second at a cycle of 33 msec. Thus, until the image is displayed on the monitor, there is a delay of up to 33/2 msec between the images of adjacent imaging fields, and a delay of up to 33 msec among three images, i.e., two adjacent images respectively on both sides of another image. During such a delay, an approaching obstacle(s) cannot be imaged. Thus, an accident might not be prevented, and an accident cause might not be found out from a recorded video picture.

Such a problem cannot be solved in the image synthesizing device itself, and the imaging operations of the camera modules CA1 to CA4 themselves need to be synchronized. For this reason, study has been conducted on the following methods: the method of simultaneously outputting activation signals to the camera modules CA1 to CA4 to start the camera modules CA1 to CA4, thereby synchronizing the imaging operations of the camera modules CA1 to CA4; and the method of outputting a common synchronization signal to the camera modules CA1 to CA4, thereby using the common synchronization signal to perform the imaging operations of the camera modules CA1 to CA4.

However, in the former method, the camera modules CA1 to CA4 individually include PLLs (phase synchronization control circuits), and therefore, it is difficult to synchronize clocks even if the camera modules CA1 to CA4 are started simultaneously. Moreover, even if synchronization is temporarily made, the clocks from crystal oscillators embedded respectively in the camera modules shift from each other over time, and the phases of the vertical synchronization signals for determining imaging timing shift from each other.

In the latter method, a synchronization signal generator configured to generate the common synchronization signal is required, and therefore, the entire configuration of the system is complicated. Moreover, since a response time for the synchronization signal is different among the camera modules CA1 to CA4, there might be a phase difference among the vertical synchronization signals generated by the camera modules CA1 to CA4.

Further, an existing camera module generates a vertical synchronization signal for determining imaging timing from an embedded clock, and therefore, the existing camera module cannot be used without extensive modification.

In addition, in the case where each camera module outputs an image to the image synthesizing device at a cycle of 33 msec as described above, although there is a probability of causing a phase shift of up to 33 msec, correction of the phase of the vertical synchronization signal is limited to about several tens of microseconds at one time in the existing camera module. It has been considered that it is extremely difficult to synchronize and control, from the outside, the vertical synchronization signals of all of the camera modules.

For the above-described reasons, real-time performance is required for a synthesized image, whereas such real-time performance cannot be achieved without extensive modification of an existing camera module.

The present invention has been made in view of the above-described existing problems, and is intended to provide an image processing system configured to synchronize imaging operations of a plurality of camera modules to synthesize, in real time, images acquired by the plurality of camera modules to output the image to a monitor.

Moreover, the present invention is intended to provide an image processing system configured to synchronize imaging operations of all of camera modules without extensive modification of an existing camera module structure.

Solution to Problem

In order to accomplish the above-described objectives, an image processing system according to a first aspect of the invention includes a plurality of camera modules each including an imager configured to acquire an image at the timing of a vertical synchronization signal repeated at a fixed cycle, and a phase controller configured to control the phase of the vertical synchronization signal, and each configured to output the vertical synchronization signal together with a corresponding one of image signals of images of different imaging fields, an image synthesizing unit configured to synthesize, based on the image signal and the vertical synchronization signal output from each of the plurality of camera modules, the images acquired by the plurality of camera modules to generate a single synthesized image, and a video picture output unit configured to output, as a video picture, synthesized images continuously generated by the image synthesizing unit to a monitor. The image processing system further includes a phase monitoring unit configured to compare the phases of the vertical synchronization signals output from the plurality of camera modules; and a relative phase control unit configured to output a relative phase control signal to the phase controller of each camera module at a predetermined cycle such that the vertical synchronization signals of the camera modules monitored by the phase monitoring unit are synchronized with each other. The image synthesizing unit synthesizes the images acquired by the camera modules at the timing of a synchronized and controlled vertical synchronization signal to generate a single synthesized image.

The relative phase control unit outputs the relative phase control signal to the phase controller of each camera module at the predetermined cycle such that the vertical synchronization signals of the camera modules monitored by the phase monitoring unit are synchronized with each other. Thus, the phase controller of each camera module repeats, every time the relative phase control signal is input, the control of synchronizing the phase of the vertical synchronization signal with the phase of the vertical synchronization signal of the other camera module. As a result, the images acquired at the timing of the synchronized and controlled vertical synchronization signal are output from all of the camera modules.

In the image processing system according to a second aspect of the invention, each of the plurality of camera modules is placed at a corresponding portion of a vehicle to image the different imaging fields at the periphery of the vehicle, and is, via a connection cable, connected to an image synthesizing device including the phase monitoring unit, the relative phase control unit, and the image synthesizing unit. The phase monitoring unit of the image synthesizing device compares the phases of the vertical synchronization signals output from the camera modules via the connection cables. The phase controller of each camera module controls the phase of the vertical synchronization signal based on the relative phase control signal output from the relative phase control unit of the image synthesizing device via the connection cable.

The phase controller of each of the plurality of camera modules receives the relative phase control signal from the relative phase control unit of the image synthesizing unit to control the vertical synchronization signal to be synthesized with the vertical synchronization signal of the other camera module, and the plurality of camera modules images the different imaging fields at the periphery of the vehicle at the timing of the synchronized and controlled vertical synchronization signal. The image synthesizing unit generates, without delay, a synthesized image from the images of the different imaging fields at the periphery of the vehicle.

In the image processing system according to a third aspect of the invention, the phase monitoring unit compares the phases of the vertical synchronization signals output from the camera modules via the connection cables, and the relative phase control unit outputs a phase control signal for advancing or delaying the phase to each camera module such that the vertical synchronization signals of the camera modules are synchronized with each other.

The relative phase control signal for advancing or delaying the phase is, at a predetermined cycle, repeatedly output to the phase controller of each camera module. In this manner, the phase shift which cannot be eliminated by a single control performed by the phase controller is eliminated, and the vertical synchronization signals of the camera modules are synchronized with each other.

An image processing system according to a fourth aspect of the invention includes a plurality of camera modules each including an imager configured to acquire an image at the timing of a vertical synchronization signal repeated at a fixed cycle, and a phase controller configured to control the phase of the vertical synchronization signal, and each configured to output the vertical synchronization signal together with a corresponding one of image signals of images of different imaging fields, an image synthesizing unit configured to synthesize, based on the image signal and the vertical synchronization signal output from each of the plurality of camera modules, the images acquired by the plurality of camera modules to generate a single synthesized image, and a video picture output unit configured to output, as a video picture, synthesized images continuously generated by the image synthesizing unit to a monitor. The plurality of camera modules is daisy-chain-connected to the image synthesizing unit. The phase controller of one of the camera modules connected downstream of another one of the camera modules in a daisy chain controls the phase of the vertical synchronization signal to be synchronized with the phase of the vertical synchronization signal input from the another one of the camera modules. The one of the camera modules outputs one or more image signals input from the another one of the camera modules, the vertical synchronization signal whose phase is controlled by the phase controller, and image signals of images acquired by the imager at the timing of the vertical synchronization signal whose phase is controlled by the phase controller.

The phase controller of the downstream camera module connected in the daisy chain controls the phase of the vertical synchronization signal to be synchronized with the phase of the vertical synchronization signal of the camera modules upstream of such a downstream camera module, and all of the downstream camera modules connected in the daisy chain similarly control the phase of the vertical synchronization signal. In this manner, the vertical synchronization signals of the camera modules other than the most upstream camera module farthest from the second imaging device are synchronized with the vertical synchronization signal of the most upstream camera module. As a result, images acquired at the timing of the synchronized and controlled vertical synchronization signal are output from all of the daisy-chain-connected camera modules to the image synthesizing unit connected on the most downstream side.

In the image processing system according to a fifth aspect of the invention, each of the plurality of daisy-chain-connected camera modules is placed at a corresponding portion of a vehicle to image the different imaging fields at the periphery of the vehicle.

All of the camera modules each placed at the corresponding portion of the vehicle are, starting from the image synthesizing unit, connected together in series by the connection cables.

According to the first and fourth aspects of the invention, images acquired by the synchronized imaging operations of the camera modules are input to the image synthesizing unit, and therefore, synthesized images can be generated in real time and can be displayed on the monitor.

Moreover, the imaging operations of all of the camera modules configured to acquire images to be synthesized are synchronized and controlled. Thus, there is no problem in which some of the camera modules cannot image an approaching obstacle(s), and therefore, the continuity of the images to be synthesized is not damaged.

Further, an existing camera module configured to generate a vertical synchronization signal from an embedded clock and allowing a phase controller to perform only a phase correction of several tens of microseconds at one time can be synchronized with an imaging operation of other camera module without modification of the structure of the existing camera module. Thus, the existing camera module can be used to add an imaging field and to facilitate replacement of the camera module.

According to the second aspect of the invention, the images of the different imaging fields at the periphery of the vehicle can be, as the synthesized image, displayed on the monitor in real time, and therefore, the second aspect of the invention can be used for an operation support system for detecting, for accident prevention, an object(s) approaching the vehicle at high speed.

Moreover, the images of the different imaging fields at the periphery of the vehicle are acquired by the plurality of camera modules at the synchronized imaging timing, and therefore, synthesized images can be generated without damaging the continuity of the images. By recording a video picture output to the monitor, an accident cause can be found out from the images of the different imaging fields without exception.

Further, by connecting the existing camera modules and the image synthesizing device with the connection cables, addition of a camera module to another installation position of the vehicle and replacement of the existing camera module can be achieved without changing the structure of the existing camera module.

According to the third aspect of the invention, even if the existing camera module allowing only a phase correction of several tens of microseconds at one time is used, the vertical synchronization signals of all of the camera modules can be synchronized with each other.

Moreover, according to the fourth aspect of the invention, the plurality of camera modules and the image synthesizing unit can be connected together via the connection cables allowing one-way communication.

According to the fifth aspect of the invention, wiring of the connection cable between the image synthesizing unit disposed in the vicinity of a driver's seat near the monitor and each camera module placed at the corresponding portion of the vehicle can be simplified, and the length of wiring can be shortened.

DESCRIPTION OF EMBODIMENTS

An image processing system 1 of one embodiment of the present invention will be described below with reference to FIGS. 1 to 3. The image processing system 1 is used as an operation support system for the purpose of detecting, for accident prevention, an object(s) approaching a vehicle at high speed. As illustrated in FIG. 1, four camera modules CA1 to CA4 are used. The camera module CA1 is placed at a front portion of a vehicle 50 such that the imaging direction thereof points forward of the vehicle 50 in a slightly-downward direction, the camera module CA2 is placed at a right portion of the vehicle 50 such that the imaging direction thereof points to the right of the vehicle 50 in the slightly-downward direction, the camera module CA3 is placed at a rear portion of the vehicle 50 such that the imaging direction thereof points backward of the vehicle 50 in the slightly-downward direction, and the camera module CA4 is placed at a left portion of the vehicle 50 such that the imaging direction thereof points to the left of the vehicle 50 in the slightly-downward direction.

Thus, each of the camera modules CA1 to CA4 acquires a corresponding one of images IM1 to IM4 of imaging fields VW1 to VW4 at a rate of 30 frames/sec. Adjacent ones of the images IM1 to IM4 of the imaging fields VW1 to VW4 overlap with each other as illustrated in the figure, and therefore, a later-described control circuit 14 operating as an image synthesizing unit corrects overlapping portions of the images IM1 to IM4 to synthesize the four types of images IM1 to IM4, and then, generates a single synthesized image viewed from above the vehicle 50.

The camera modules CA1 to CA4 are camera modules CA typically used for the operation support system of this type and having the same configuration. As illustrated in FIG. 2, each of the camera modules CA1 to CA4 includes an imager 2 configured to image the imaging fields VW1 to VW4, a phase controller 3 configured to control the phase of a vertical synchronization signal Vsync indicating the timing of imaging by the imager 2, and a series-parallel/parallel-series converter circuit 4 serving as an input-output interface of the camera module CA.

The imager 2 acquires, at an imaging cycle of 1/30 seconds per frame, i.e., at a cycle of about 33 msec, the image IM of the imaging field VW in response to a horizontal synchronization signal Hsync and the vertical synchronization signal Vsync, the horizontal and vertical synchronization signals Hsync, Vsync being obtained in such a manner that a clock of a not-shown embedded oscillator is frequency-divided. Then, the imager 2 converts an image signal Sp indicating the image IM and the horizontal and vertical synchronization signals Hsync, Vsync in acquiring of the image IM into 96-Mhz 8-bit parallel signals to output such parallel signals to the series-parallel/parallel-series converter circuit 4 via a data bus 5.

Since the camera modules CA1 to CA4 are designed to have the same configuration and specifications, the frequency of the vertical synchronization signal Vsync obtained by frequency-division of the clock is the same among the camera modules CA1 to CA4. However, the phases of the vertical synchronization signals Vsync of the camera modules CA1 to CA4 upon start-up are independent from each other, and shift from each other. For the sake of simplicity of description, as illustrated in, e.g., FIG. 3, the vertical synchronization signal Vsync-1 of the camera module CA1 advances by +α1 as compared to a reference signal Sr having a cycle of 1/30 seconds, the vertical synchronization signal Vsync-2 of the camera module CA2 advances by +α2, the vertical synchronization signal Vsync-3 of the camera module CA3 delays by −α3, and the vertical synchronization signal Vsync-4 of the camera module CA4 advances by +α4.

The phase controller 3 receives, via the data bus 5, a relative phase control signal output from a later-described relative phase controller 12, and then, corrects the phase of the vertical synchronization signal Vsync within a range of ±10 μsec by a single control according to the control contents of the relative phase control signal. That is, in the case of receiving a relative phase control signal for advance control, the control of advancing the phase of the vertical synchronization signal Vsync by +10 μsec is repeated. In the case of receiving a relative phase control signal for delay control, the control of delaying the phase of the vertical synchronization signal Vsync by +10 μsec is repeated.

Each of the camera modules CA1 to CA4 is connected to an image synthesizing device 10 placed near a driver's seat of the vehicle 50 via an LVDS (low voltage differential signaling) cable 6 having a length of 3 to 8 m. Since the LVDS cable 6 is a bidirectional serial transmission line, the series-parallel/parallel-series converter circuit 4 of each of the camera modules CA1 to CA4 serializes the 8-bit parallel signals of the image signal Sp, the horizontal synchronization signal Hsync, and the vertical synchronization signal Vsync output via the data bus 5, and then, outputs the serialized signals to the LVDS cable 6. In addition, the series-parallel/parallel-series converter circuit 4 parallelizes the relative phase control signal input from the relative phase controller 12 via the LVDS cable 6, and then, outputs the parallelized signal to the data bus 5.

Similarly, a series-parallel/parallel-series converter circuit 13 is connected between a data bus 16 in the image synthesizing device 10 and each LVDS cable 6 connected to a corresponding one of the camera modules CA1 to CA4. The series-parallel/parallel-series converter circuit 13 parallelizes the image signal Sp, the horizontal synchronization signal Hsync, and the vertical synchronization signal Vsync output to each LVDS cable 6 to output the parallelized signals to the data bus 16. In addition, the series-parallel/parallel-series converter circuit 13 serializes the relative phase control signal output in the form of an 8-bit parallel signal from the data bus 16 to output the serialized signal to each LVDS cable 6.

Figure 2:
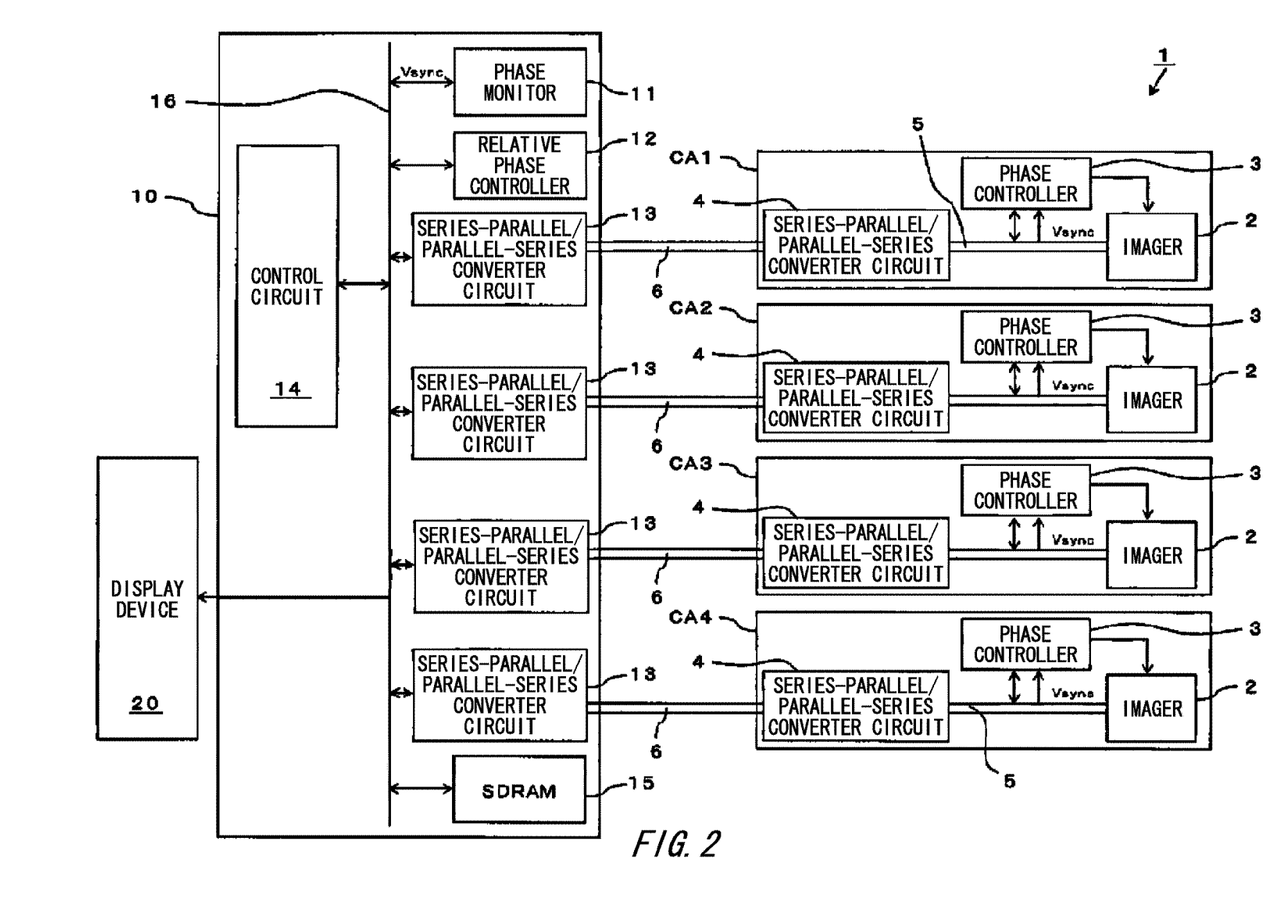
FIG. 2 is a block diagram illustrating an image processing system 1 of one embodiment of the present invention.
Figure 3:
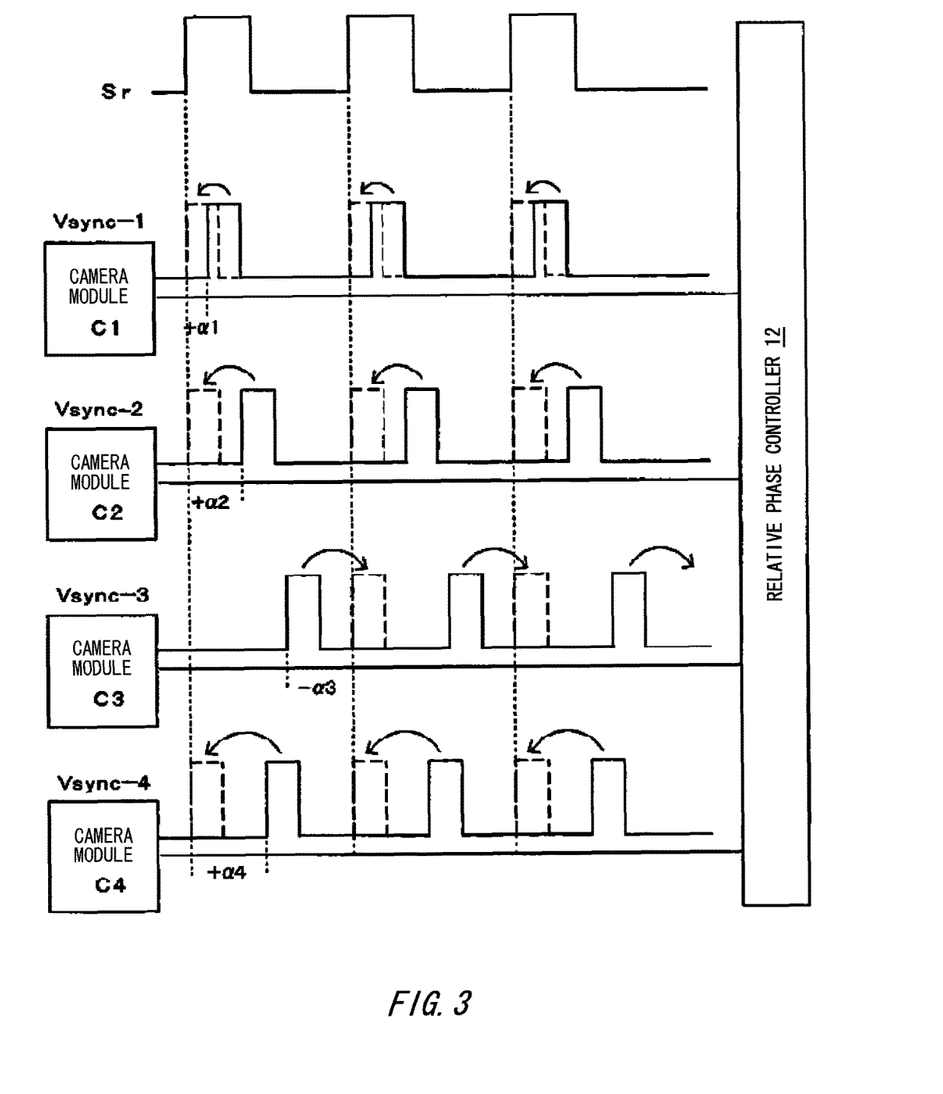
FIG. 3 is a diagram for describing a relative phase control signal output from a relative phase controller 12 to a phase controller 3 of each camera module CA.

As illustrated in FIG. 2, the image synthesizing device 10 includes a phase monitor 11, the relative phase controller 12, the control circuit 14, and an SDRAM 15 connected together via the data bus 16. Every time the image signals Sp are input from the camera modules CA1 to CA4, the control circuit 14 temporarily stores, at the SDRAM 15, such image signals Sp as the images IM1 to IM4 acquired by the camera module CA1 to CA4 based on the horizontal and vertical synchronization signals Hsync, Vsync input together with the image signals Sp.

Moreover, when the image signals Sp are input from the camera modules CA1 to CA4, the phase monitor 11 monitors the phases of the vertical synchronization signals Vsync input together with the image signals Sp to compare the relative phase among the camera modules CA1 to CA4. For comparison of the relative phase, the vertical synchronization signal Vsync of any one of the camera modules CA may be used as a reference signal to compare the phase shift between such a reference vertical synchronization signal Vsync and each of the vertical synchronization signals Vsync of the other camera modules CA. However, in the present embodiment, the relative phase shift of each of the camera modules CA1 to CA4 with respect to the reference signal Sr generated from a not-shown clock in the image synthesizing device 10 and having a cycle of 1/30 seconds is compared.

The relative phase controller 12 generates, at a fixed cycle, a relative phase control signal for correcting the phase of the vertical synchronization signal Vsync of each of the camera modules CA1 to CA4 based on the relative phase shift of each of the camera modules CA1 to CA4 detected by the phase monitor 11, and outputs the relative phase control signal to the phase controller 3 of each of the camera modules CA1 to CA4 via the LVDS cable 6. In the present embodiment, in the case where the phase of the vertical synchronization signal Vsync input from each of the camera modules CA1 to CA4 delays with respect to the reference signal Sr, the relative phase control signal for advance control is generated. In the case where the phase of the vertical synchronization signal Vsync input from each of the camera modules CA1 to CA4 advances with respect to the reference signal Sr, the relative phase control signal for delay control is generated. Then, such a relative phase control signal is output to the phase controller 3 of a corresponding one of the camera modules CA1 to CA4. Moreover, in the case where the phase of the vertical synchronization signal Vsync matches with that of the reference signal Sr, no relative phase control signal is output. For example, when the vertical synchronization signals Vsync of the camera modules CA1 to CA4 have phases illustrated in FIG. 3, the relative phase control signal for delay control is output to the phase controller 3 of each of the camera modules CA1, CA2, CA4, and the relative phase control signal for advance control is output to the phase controller 3 of the camera module CA3.

The cycle of outputting the relative phase control signal from the relative phase controller 12 can be optionally set, but the relative phase control signal is output at the cycle of the reference signal Sr in the present embodiment. Thus, the phase controller 3 of each of the camera modules CA1 to CA4 repeats phase correction control of the vertical synchronization signal Vsync according to the control contents of the relative phase control signal until the relative phase control signal is subsequently input at the cycle of the reference signal Sr. As long as there is a phase shift between the vertical synchronization signal Vsync and the reference signal Sr, the phase control of synchronizing the vertical synchronization signal Vsync with the reference signal Sr is repeated. For this reason, the vertical synchronization signals Vsync of all of the camera modules CA1 to CA4 are finally converged to the same phase as that of the reference signal Sr.

Each of the camera modules CA1 to CA4 acquires a corresponding one of the images IM1 to IM4 at the timing of the vertical synchronization signal Vsync synchronized with the reference signal Sr, and then, outputs the image signal Sp indicating the corresponding one of the images IM1 to IM4 to the image synthesizing device 10. Thus, the control circuit 14 reads, from the SDRAM 15, four images IM1 to IM4 stored in the SDRAM 15 substantially at the same time, and then, generates a single synthesized image. Since the image signals Sp indicating the images IM1 to IM4 are input at a cycle of 1/30 seconds, the control circuit 14 also outputs the synthesized image to a display device 20 at a cycle of 1/30 seconds, and a video picture showing the periphery of the vehicle 50 from above the vehicle 50 is displayed on the display device 20.

In the above-described embodiment, there are two patterns, i.e., the advance and delay controls, of the control contents of the relative phase control signal output from the relative phase controller 12 at a predetermined cycle. In addition to the advance or delay control, the number of correction control of the phase of the vertical synchronization signal Vsync by the phase controller 3 of each of the camera modules CA1 to CA4 according to a phase difference may be included.

Moreover, in the above-described embodiment, the relative phase control signal is output to the phase controller 3 of each of the camera modules CA1 to CA4 star-connected, via the LVDS cables 6, to the image synthesizing device 10 configured to generate a synthesized image, and then, the imaging timing is synchronized among the camera modules CA1 to CA4. However, all of the camera modules CA1 to CA4 may be divided into two or more groups, and the camera module(s) CA of each group may be, via the LVDS cable 6, daisy-chain-connected to the image synthesizing device 10 configured to generate a synthesized image. The relative phase control signal may be output from the image synthesizing device 10 to the phase controller(s) 3 of the camera module(s) CA daisy-chain-connected to the image synthesizing device 10.

Further, all of the camera modules CA1 to CA4 can be, in a line, daisy-chain-connected to the image synthesizing device configured to generate a synthesized image, and then, the vertical synchronization signals Vsync of the camera modules CA1 to CA4 can be synchronized for synchronization of the imaging operations of the camera modules CA1 to CA4. An image processing system 30 of such a second embodiment will be described below with reference to FIG. 4. In the description of the image processing system 30, the same reference numerals as those in the first embodiment are used to represent the same or equivalent elements in the configuration of the second embodiment, and the description thereof will not be repeated.

Figure 4:
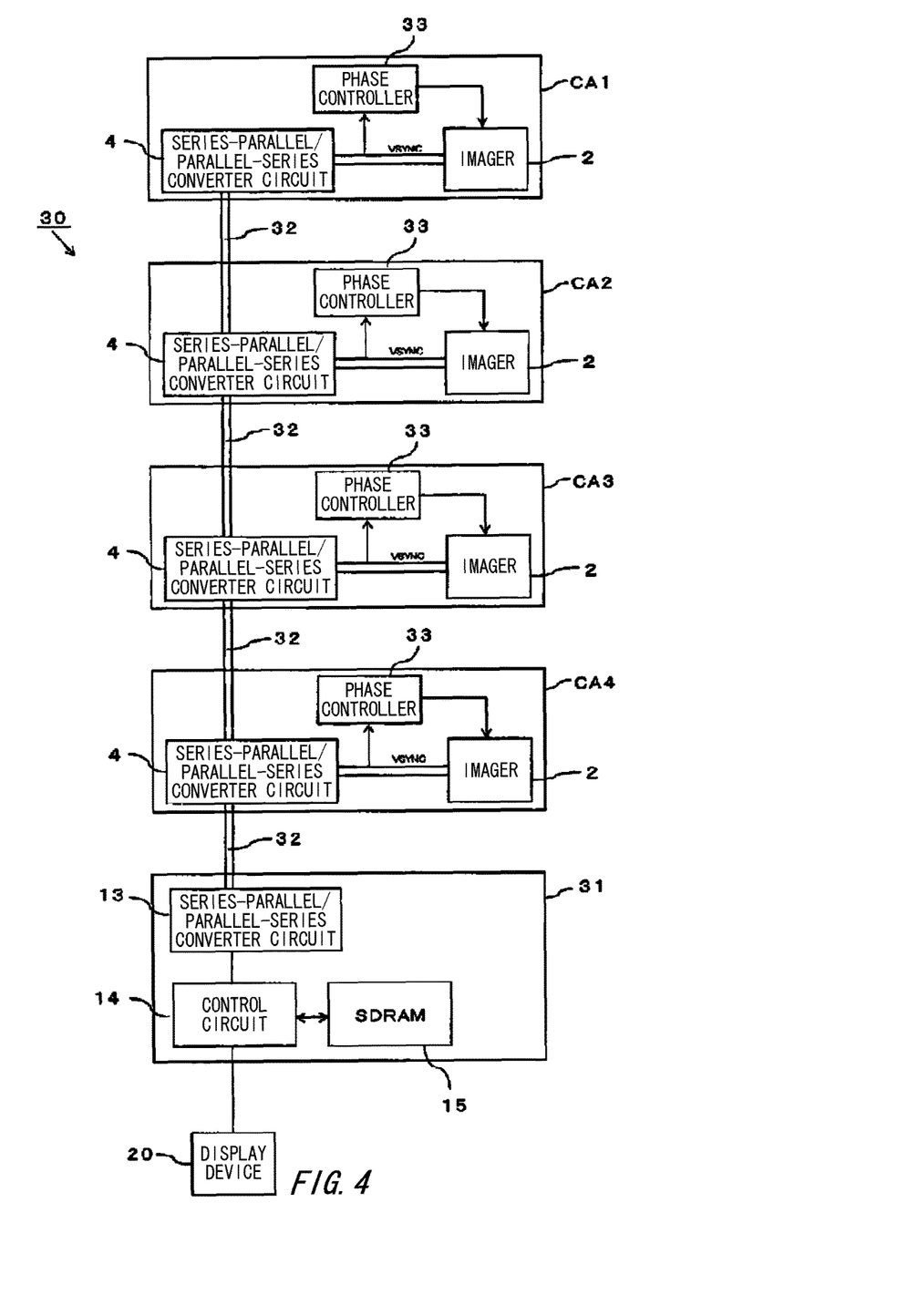
FIG. 4 is a block diagram illustrating an image processing system 30 of a second embodiment.

In the image processing system 30, four camera modules CA1 to CA4 illustrated in FIG. 1 are daisy-chain-connected to an image synthesizing device 31 placed near a driver's seat of a vehicle 50. That is, adjacent two of the camera modules CA1 to CA4 and the image synthesizing device 31 in a clockwise direction as viewed from above the vehicle 50 are connected together via an LVDS cable 32 wired between such a pair, and series connection is made from the most upstream camera module CA1 to the image synthesizing device 31. Thus, all of the camera modules CA1 to CA4 can be connected to the image synthesizing device 31 via substantially a single round of wire around the vehicle 50.

As in the first embodiment, the camera modules CA1 to CA4 are camera modules CA typically used for the operation support system of this type and having the same configuration. Each of the camera modules CA1 to CA4 includes an imager 2 configured to image imaging fields VW1 to VW4, a phase controller 33 configured to control the phase of a vertical synchronization signal Vsync indicating the timing of imaging by the imager 2, and a series-parallel/parallel-series converter circuit 4 serving as an input-output interface. In the most upstream camera module CA1, the phase controller 33 is not necessarily provided, and the series-parallel/parallel-series converter circuit 4 may be replaced with a circuit only for parallel-series conversion.

The imager 2 of the most upstream camera module CA1 acquires, at an imaging cycle of 1/30 seconds per frame, i.e., at a cycle of about 33 msec, an image IM1 of the imaging field VW1 in response to a horizontal synchronization signal Hsync and the vertical synchronization signal Vsync, the horizontal and vertical synchronization signals Hsync, Vsync being obtained in such a manner that a clock of a not-shown embedded oscillator is frequency-divided. Then, the imager 2 outputs an image signal Sp1 indicating the image IM1 and the horizontal and vertical synchronization signals Hsync, Vsync in acquiring of the image IM1 (the image signal Sp and the horizontal and vertical synchronization signals Hsync, Vsync output together with the image signal Sp are together referred to as an "imaging signal Sim") to the camera module CA2 downstream of the camera module CA1 via the LVDS cable 32.

Moreover, the camera module CA2 outputs the imaging signal Sim-1 input from the camera module CA1 and an imaging signal Sim-2 to the camera module CA3 downstream of the camera module CA2 via the LVDS cable 32, the imaging signal Sim-2 including an image signal Sp2 of an image IM2 of the imaging field VW2 and horizontal and vertical synchronization signals Hsync-1, Vsync-1 in acquiring of the image IM2.

The similar process is performed for the camera modules CA3, CA4, and as a result, the imaging signals Sim-1 to Sim-4 indicating the images IM1 to IM4 are output from the camera module CA4 to the image synthesizing device 31 via the LVDS cable 32. A control circuit 14 of the image synthesizing device 31 synthesizes the images IM1 to IM4 generated based on the imaging signals Sim-1 to Sim-4 to generate a synthesized image, and outputs the synthesized image to a display device 20 at a cycle of 1/30 seconds. Then, a video picture showing the periphery of the vehicle 50 from above the vehicle 50 is displayed on the display device 20.

The phase controllers 33 of the camera modules CA2 to CA4 other than the most upstream camera module CA1 monitor the phase of the vertical synchronization signal Vsync-1 contained in the imaging signal Sim-1 input from the camera module CA upstream thereof, and repeats phase correction control within a range of ±10 μsec to synchronize the vertical synchronization signals Vsync of the camera modules CA2 to CA4 themselves with the vertical synchronization signal Vsync-1. As a result, the vertical synchronization signals Vsync of all of the camera modules CA1 to CA4 are converged to the phase synchronized with the vertical synchronization signal Vsync-1 of the camera module CA1. Then, the image signals Sp1 to Sp4 of the images IM1 to IM4 acquired at the timing of the synchronized and controlled vertical synchronization signal Vsync are output from all of the daisy-chain-connected camera modules CA1 to CA4 to the image synthesizing device 31 connected on the most downstream side.

The above-described embodiments describe the image processing systems 1, 30 used for the purpose of the operation support system of the vehicle, and therefore, the camera modules CA1 to CA4 are each placed at a corresponding portion of the vehicle 50. However, as long as an image processing system synthesizes images of different imaging fields at a fixed cycle to display, as a video picture, continuously-generated synthesized images on a display device, the installation positions of camera modules and the number of camera modules are not limited to those of the above-described embodiments.

A unit and method for continuously displaying synthesized images as a video picture can be optionally selected according to intended use.

INDUSTRIAL APPLICABILITY

The embodiment(s) of the present invention is suitable for an image processing system for detecting an approaching object(s) at high speed in a wide imaging field of view.

REFERENCE SIGNS LIST 1, 30 Image processing system
2 Imager
3 Phase controller
6 LVDS cable (connection cable)
10 Image synthesizing device
11 Phase monitor (phase monitoring unit)
12 Relative phase controller (relative phase control unit)
14 Control circuit (image synthesizing unit, video picture output unit)
20 Display device (monitor)
31 Image synthesizing device
50 Vehicle
IM Image
Vsync Vertical synchronization signal
CA Camera module
Sp Image signal
VW Imaging field

The invention claimed is:

1. An image processing system, comprising:
a plurality of camera modules
each including an imager configured to acquire an image at a timing of a vertical synchronization signal repeated at a same cycle, and a phase controller configured to repeat a phase control for incrementally correcting a phase of the vertical synchronization signal according to a control content of a relative phase control signal input from outside the respective camera module, and
each configured to output the vertical synchronization signal together with a corresponding image signal of an image of a corresponding different imaging field;
an image synthesizing unit configured to synthesize, based on the image signal and the vertical synchronization signal output from each of the plurality of camera modules, the images acquired by the plurality of camera modules to generate a single synthesized image;
an imager configured to output, as a video picture, synthesized images continuously generated by the image synthesizing unit to a monitor;
a phase monitor configured to compare the phase of the vertical synchronization signal output from each of the plurality of camera modules with a reference signal Sr having a same cycle as the vertical synchronization signal, and detect a relative phase shift with respect to the reference signal Sr; and
a relative phase controller configured to generate, based on the relative phase shift, the relative phase control signal for advancing or delaying a phase of the vertical synchronization signal of each camera module, and to repeatedly output the relative phase control signal to the phase controller of each camera module at a predetermined cycle such that the vertical synchronization signals of the camera modules monitored by the phase monitor are incrementally synchronized with the reference signal Sr, wherein
the image synthesizing unit synthesizes the images acquired by the camera modules each at a timing of the vertical synchronization signal incrementally synchronized with the reference signal Sr, to generate the single synthesized image, and
the phase monitor and the relative phase controller are provided in an image synthesizing device, and transmit the phase control signal to each camera module via a connection cable based on a detection result of a phase shift with respect to the reference signal Sr, the detection result being detected inside of the image synthesizing device.

2. The image processing system according to claim 1, wherein
each camera module is placed at a corresponding portion of a vehicle to image the corresponding different imaging field at a periphery of the vehicle, and is, via the connection cable, connected to an image synthesizing device including the phase monitor, the relative phase controller, and the image synthesizing unit,
the phase monitor of the image synthesizing device compares phases of the vertical synchronization signals output from each of the camera modules via the connection cables with the reference signal Sr, and
the phase controller of each camera module controls the phase of the respective vertical synchronization signal based on the relative phase control signal output from the relative phase controller via the connection cable.

3. An image processing system, comprising:
a plurality of camera modules
each including an imager configured to acquire an image at a timing of a vertical synchronization signal repeated at a same cycle, and a phase controller configured to repeat a phase control for incrementally correcting a phase of the vertical synchronization signal according to a control content of a relative phase control signal input from outside the respective camera module, the relative phase control signal advancing or delaying a phase of the vertical synchronization signal of each of the plurality of camera modules based on a relative phase shift with respect to a reference signal Sr having the same cycle as the vertical synchronization signal, and each configured to output the vertical synchronization signal together with a corresponding image signal of an image of a corresponding different imaging field;

an image synthesizing unit configured to synthesize, based on the image signal and the vertical synchronization signal output from each of the plurality of camera modules, the images acquired by the plurality of camera modules to generate a single synthesized image; and an imager configured to output, as a video picture, synthesized images continuously generated by the image synthesizing unit to a monitor, wherein the plurality of camera modules is daisy-chain-connected to the image synthesizing unit, the phase controller of a downstream one of the camera modules connected downstream of an upstream one of the camera modules in a daisy chain monitors a phase of a vertical synchronization signal included in an image signal input to the downstream camera module from the upstream camera module and repeats the phase control for incrementally correcting the phase of the vertical synchronization signal of a further downstream camera module connected further downstream of the downstream camera module so as to be incrementally synchronized with the phase of the vertical synchronization signal input from the upstream camera module, and the downstream one of the camera modules outputs one or more image signals input from the upstream one of the camera modules, the vertical synchronization signal whose phase is controlled by the phase controller, and image signals of images acquired by the imager of the downstream camera module at a timing of the vertical synchronization signal incrementally synchronized with the reference signal Sr and having a phase controlled by the phase controller, wherein a phase monitor and a relative phase controller are provided in an image synthesizing device, and transmit the phase control signal to each camera module via a connection cable based on a detection result of a phase shift with respect to the reference signal Sr, the detection result being detected inside of the image synthesizing device.

4. The image processing system according to claim 3, wherein each of the plurality of daisy-chain-connected camera modules is placed at a corresponding portion of a vehicle to image the corresponding different imaging fields at a periphery of the vehicle.

5. The image processing system according to claim 1, wherein a correction of the phase of the vertical synchronization signal is within a range of ±10 μsec by a single control.

6. The image processing system according to claim 3, wherein a correction of the phase of the vertical synchronization signal is within a range of ±10 μsec by a single control.

* * * * *